Aug. 14, 1945.  C. W. THORNTON  2,382,832
SIGNAL DEVICE FOR VEHICLES
Filed April 14, 1944
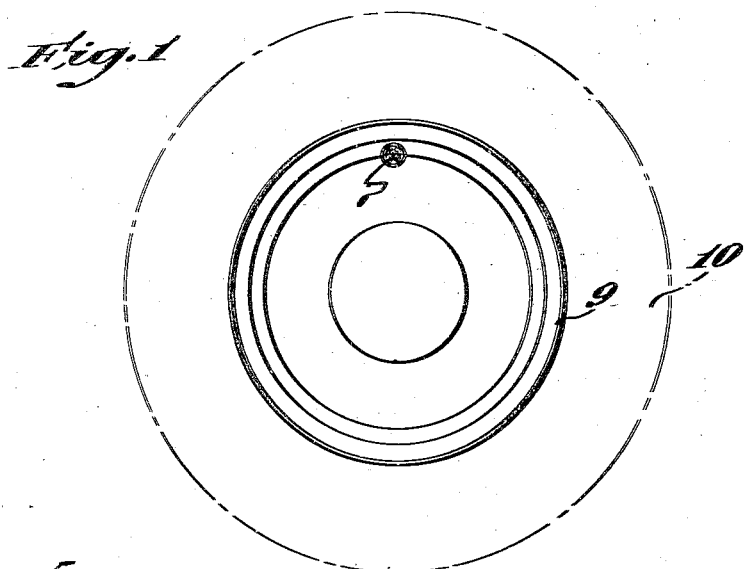
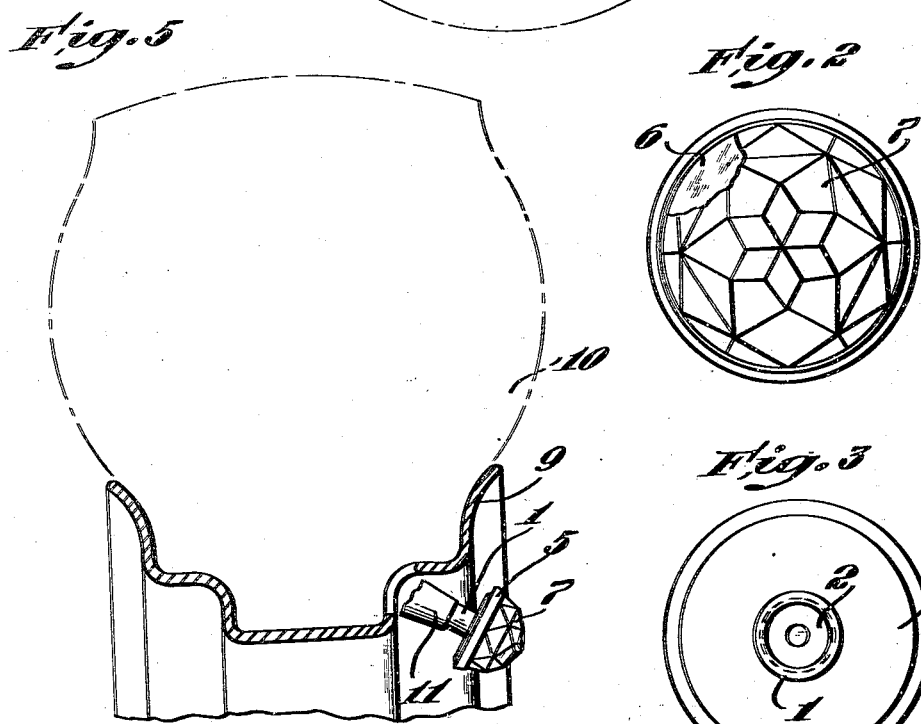
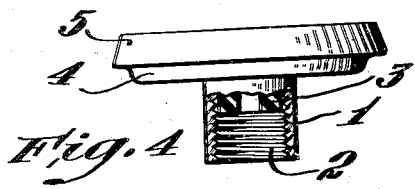
Inventor
Charles W. Thornton
by Roberts Cushman Grover
Attys.

Patented Aug. 14, 1945

2,382,832

UNITED STATES PATENT OFFICE 2,382,832

SIGNAL DEVICE FOR VEHICLES

Charles Warren Thornton, Framingham, Mass.

Application April 14, 1944, Serial No. 530,988

2 Claims. (Cl. 88—81)

This invention pertains to signals and more especially to vehicle signals of the reflector type. It is customary to mount signals of the reflector type at the rear of a motor vehicle so as to supplement the usual tail-lamp or to act as a substitute for the tail-lamp in the event that the latter fails to function or is accidentally concealed. Signals of this type do not depend upon their inherent luminosity but act by reflecting the light from the headlamps of an approaching vehicle and thus apprise the driver of the latter vehicle of the presence in the roadway of the vehicle equipped with such signals.

However, even though a vehicle have an operating tail-lamp or reflector type signal mounted at its rear, these are not always adequate as warnings, for example when an automobile is being turned about in the roadway; when it is crossing an intersecting street; or when it is parked at substantially right angles to the curbing. In these situations, the driver of an approaching vehicle receives little or no warning of the presence of the vehicle so positioned and particularly if his own headlamps are depressed or dimmed.

One object of the present invention is to provide a reflector type signal which may conveniently be mounted at the side of the automobile without necessitating any special fixtures or the use of tools, or modification of the automobile structure or its parts. A further object is to provide a reflector signal which, when the vehicle is stationary, appears as a single bright spot of light when illuminated by a headlight of an approaching vehicle, but which appears as a ring of light of substantial diameter when the vehicle is moving, thus providing an especially noticeable warning when the vehicle is crossing an intersecting way. A further object is to provide a simple, inexpensive reflector signal so designed that it may be used in substitution for the usual valve cap of a vehicle wheel and which affords an element of large diameter to be grasped by the fingers of the user in applying and removing it. These and other objects and advantages of the invention will be pointed out in the following more detailed description and by reference to the accompanying drawing wherein Fig. 1 is a side elevation of the rim of a vehicle wheel equipped with one of the improved signal devices, the tire being shown in broken lines;

Fig. 2 is a front elevation to larger scale of the signal device of the present invention;

Fig. 3 is a rear view of the signal device;

Fig. 4 is an edge elevation of the signal device, omitting the transparent faceted button, and with the stem portion partly broken away; and Fig. 5 is a transverse section through the rim of a vehicle wheel showing the tire in broken lines and with a portion of the valve stem shown in full lines with the signal device of the present invention applied thereto.

Referring to the drawing the numeral 1 designates a short nipple member having an internally screw threaded bore 2 designed to have threaded engagement with the usual valve stem of a vehicle tire in substitution for the valve cap customarily employed. Preferably this nipple is provided with a resilient, for example, a rubber annular washer 3 at its inner end, for engagement with the end of the valve stem. The nipple 1 is integral with or fixedly united to a disk-like member 4 having an inwardly inclined marginal flange 5. The disk 4 supports a reflector element 6 of any usual character, for example a disk of brightly polished metal which is disposed within the rim 5. Covering and housing this reflector element 6 is a button 7 of light-transmitting material, for example glass, preferably faceted so as to disperse the light in many directions, as is customary in signals of the reflector type. This button 7 may be of colored glass if desired and has a beveled edge which is held snugly in place by the inwardly inclined rim or flange 5. The disk 4 with its flange rim 5 may be of any desired size, although a diameter of approximately 1 inch is found to be desirable. In use, the usual valve cap is removed from the stem 11 of the tire 10 and the nipple 1 is screwed onto the valve stem in place of the cap, thus positioning the signal device as shown for example in Figs. 1 and 5. Since the disk 4 with its rim 5 is substantially larger than the usual valve cap, it is more readily grasped between the thumb and fingers and may be put in place and tightened firmly or removed without the use of tools, and more readily than the usual small diameter valve cap.

When in place on the wheel the signal device reflects the light of an on-coming vehicle approaching from the side and, if the vehicle equipped with the signal is standing still, the signal appears as a brilliant spot of light in the beam of the approaching headlight. On the other hand when the vehicle having the improved signal is moving, for example crossing an intersecting highway, the rotation of the wheel causes the signal to appear as a ring of light of a diameter substantially equal to the diameter of the wheel rim, thus forming an outstanding signal and giving warning that an automobile is crossing the intersection.

The nipple 1 and the disk 4 with its rim 5 may be made of any suitable material, for example metal or a plastic, and obviously may be made very cheaply, and by reason of its particular construction the reflector may be mounted upon the side of the vehicle without the use of tools or requiring any modification whatever in the vehicle structure.

While one desirable embodiment of the invention has been illustrated by way of example it is to be understood that the invention is to be regarded as inclusive of any and all equivalents falling within the scope of the appended claims.

I claim:

1. A reflector signal for use with vehicle wheels provided with pneumatic tires, said signal comprising a disk-like head having at one side thereof a reflecting element and a transparent faceted housing for the latter, and having at its other side a nipple extending axially of the head, the nipple being internally screw threaded for engagement with the screw threads of the tire valve stem, the signal thus being operative to act in substitution for the usual valve cap.

2. A combined valve cap and reflector signal for use with a vehicle having a pneumatic tire, said combined cap and signal comprising an elongate tubular support internally screw threaded for engagement with the tire valve stem in place of the usual valve cap, said support being closed at one end by a disk coaxial with the support and carrying a reflecting element at its outer surface, the disk having a rim flange, and a faceted button of light-transmitting material having its edge seated within and interlocked with the flange of the disk.

CHARLES WARREN THORNTON.